(12) United States Patent
Charles

(10) Patent No.: US 10,440,575 B2
(45) Date of Patent: *Oct. 8, 2019

(54) PROTECTION OF A SECURITY ELEMENT COUPLED TO AN NFC CIRCUIT

(71) Applicant: STMicroelectronics (Rousset) SAS, Rousset (FR)

(72) Inventor: Alexandre Charles, Auriol (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,917

(22) Filed: Oct. 3, 2017

(65) Prior Publication Data

US 2018/0049031 A1    Feb. 15, 2018

Related U.S. Application Data

(63) Continuation of application No. 14/850,676, filed on Sep. 10, 2015, now Pat. No. 9,801,070, which is a (Continued)

(30) Foreign Application Priority Data

Jan. 14, 2011    (FR) .................................... 11 50322

(51) Int. Cl.
*H04W 12/08* (2009.01)
*G06Q 20/32* (2012.01)
(Continued)

(52) U.S. Cl.
CPC ........ *H04W 12/08* (2013.01); *G06Q 20/3227* (2013.01); *G06Q 20/3229* (2013.01);
(Continued)

(58) Field of Classification Search
CPC ....... H04W 12/08; H04W 4/80; H04W 12/06; G06Q 20/3227; G06Q 20/3229; H04M 1/7253; H04M 2250/04; H04M 1/67
See application file for complete search history.

(56) References Cited

U.S. PATENT DOCUMENTS 7,119,686 B2    10/2006    Bertness et al.
7,314,165 B2    1/2008    Bonalle et al.
(Continued)

FOREIGN PATENT DOCUMENTS

CN    101329399 A    12/2008
CN    101639890 A    2/2010
(Continued)

OTHER PUBLICATIONS

French Search Report and Written Opinion, dated Aug. 16, 2011, for corresponding FR Application No. 1150322, 7 pages.

*Primary Examiner* — Mazda Sabouri
(74) *Attorney, Agent, or Firm* — Seed Intellectual Property Law Group LLP

(57) ABSTRACT

A method and a device for protecting a security module connected to a near-field communication router in a telecommunication device, wherein a transmission between the router and the security module is only allowed in the presence of a radio frequency communication flow detected by the router.

18 Claims, 4 Drawing Sheets

Related U.S. Application Data continuation of application No. 13/334,085, filed on Dec. 22, 2011, now Pat. No. 9,179,307.

(51) Int. Cl.
*H04M 1/725* (2006.01)
*H04W 12/06* (2009.01)
*H04W 4/80* (2018.01)
*H04M 1/67* (2006.01)

(52) U.S. Cl.
CPC ........... *H04M 1/7253* (2013.01); *H04W 4/80* (2018.02); *H04W 12/06* (2013.01); *H04M 1/67* (2013.01); *H04M 2250/04* (2013.01)

(56) References Cited

U.S. PATENT DOCUMENTS

| | | | |
|---|---|---|---|
| 8,532,615 | B2 | 9/2013 | Nagano |
| 8,761,665 | B2 | 6/2014 | Lee |
| 8,929,815 | B2 | 1/2015 | Lee |
| 2008/0102791 | A1 | 5/2008 | Lauridsen et al. |
| 2008/0121687 | A1 | 5/2008 | Buhot |
| 2009/0011648 | A1* | 1/2009 | Kargl ............... G06K 7/0008 439/630 |
| 2010/0090805 | A1 | 4/2010 | Libotte |
| 2010/0144269 | A1 | 6/2010 | Do et al. |
| 2010/0210300 | A1 | 8/2010 | Rizzo et al. |
| 2011/0237221 | A1 | 9/2011 | Prakash et al. |
| 2011/0250839 | A1 | 10/2011 | Lee |
| 2011/0269423 | A1 | 11/2011 | Schell et al. |
| 2012/0052801 | A1 | 3/2012 | Kulkarni |

FOREIGN PATENT DOCUMENTS

| | | |
|---|---|---|
| CN | 101772215 A | 7/2010 |
| CN | 101887617 A | 11/2010 |
| CN | 101908157 A | 12/2010 |
| EP | 2 221 984 A1 | 8/2010 |
| WO | 2010/114210 A1 | 10/2010 |

* cited by examiner

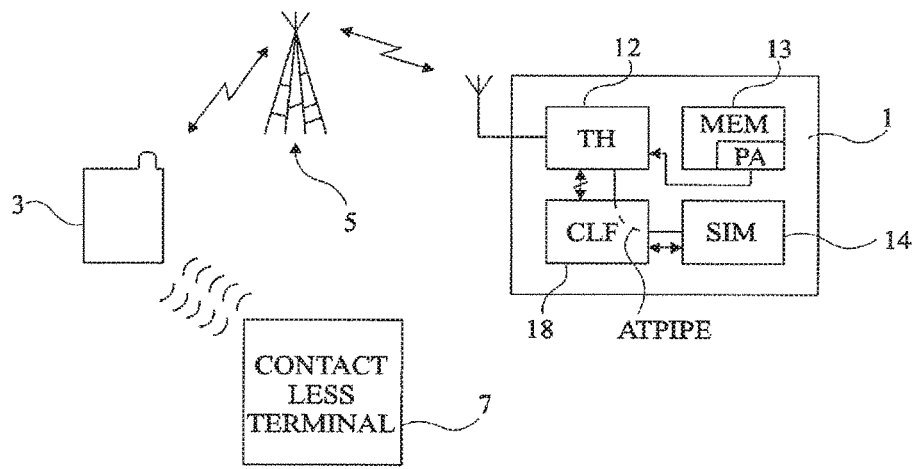
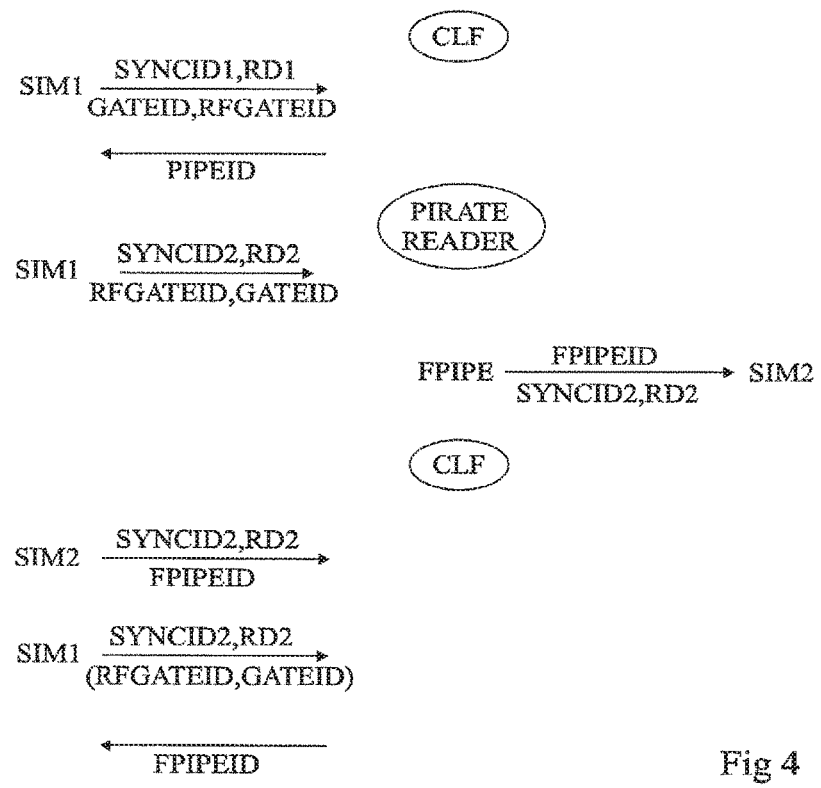

PROTECTION OF A SECURITY ELEMENT COUPLED TO AN NFC CIRCUIT

CROSS REFERENCE TO RELATED APPLICATIONS

This application is a continuation of U.S. patent application Ser. No. 14/850,676, filed Sep. 10, 2015, which is a continuation of U.S. patent application Ser. No. 13/334,085, filed Dec. 22, 2011, issued as U.S. Pat. No. 9,179,307, which claims the priority benefit of French patent application number 11/50322, filed on Jan. 14, 2011, entitled PROTECTION OF A SECURITY ELEMENT COUPLED TO AN NFC CIRCUIT, which are hereby incorporated by reference to the maximum extent allowable by law.

BACKGROUND

Technical Field

Embodiments relate to transactions performed by means of mobile telecommunication devices of cell phone type. Embodiments more specifically apply to such devices, further equipped with a near field communication circuit (NFC).

Discussion of the Related Art

Cell phones are more and more often equipped with a near-field communication interface which enables them to combine electromagnetic transponder functions with mobile telephony functions. In particular, this adds functions of emulation of an electromagnetic transponder, of contactless or contactless card reader type to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called an NFC router. This router is equipped with a radio frequency (RF) transceiver front head associated with a low-range antenna to communicate like an electromagnetic transponder. The router uses the capacities of the processor(s) of the mobile device for data processing and storage operations. For access control, electronic purse, payment, and other applications, a secure element enabling to authenticate the user is used. This secure element is either integrated in the mobile telecommunication device (dedicated integrated circuit, circuit welded to the printed circuit board) or contained in a microcircuit supported by a subscriber identification module (SIM), or any other removable card, for example at the standard format of a memory card.

An NFC router may also be present in a mobile device of USB key type, in a bank teller terminal, in an adhesive device (sticker), etc.

An emulation of a contactless card in a mobile telecommunication device is capable of generating weak points in terms of transaction security.

It would be desirable to be able to detect such weak points.

It would further be desirable to avoid such weak points in secure transactions.

SUMMARY

Thus, an embodiment provides a method for protecting a security module connected to a near-field communication router in a telecommunication device, wherein a transmission between the router and the security module is only allowed in the presence of a radio frequency communication flow detected by the router.

According to an embodiment of the method, the magnetic flow originates from a magnetic field within the range of the router.

According to an embodiment of the method, the presence of a radio frequency communication flow is detected by means of an antenna associated with a detection circuit different from the router.

According to an embodiment of the method, the presence of a radio frequency communication flow is indirectly detected by the presence of a power supply voltage extracted by the router from this flow.

According to an embodiment of the method, messages transmitted by the router to the security module are detected and interpreted.

Another embodiment provides a telecommunication device equipped with a near-field communication router.

According to an embodiment of the device, said device comprises a circuit of direct or indirect detection of the presence of a radio frequency communication flow within the range of said router.

According to an embodiment of the device, said detection circuit interprets messages transmitted by the router to the security module.

According to an embodiment of the device, said device further comprises a circuit for protecting a connection between said router and at least one security module.

The foregoing and other objects, features, and advantages will be discussed in detail in the following non-limiting description of specific embodiments in connection with the accompanying drawings.

BRIEF DESCRIPTION OF THE DRAWINGS

FIG. 3 very schematically illustrates an attack capable of exploiting a weakness of the telecommunication device of FIG. 1;

FIG. 4 illustrates an embodiment of a preparatory phase of such an attack;

DETAILED DESCRIPTION

Figure 1:
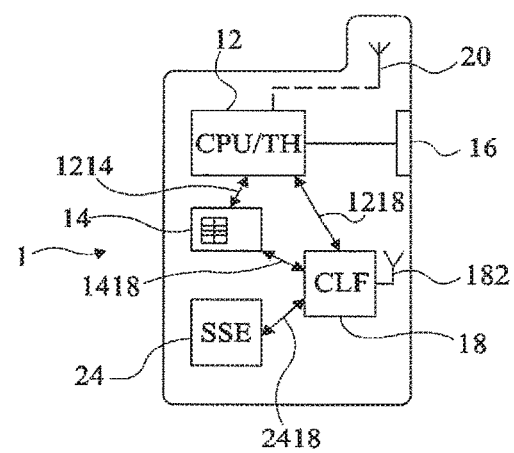
FIG. 1 schematically shows a mobile telecommunication device of the type to which embodiments apply applies as an example.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, the embodiments being compatible with usual protocols. Further, the circuits forming the mobile communication device have not been detailed either, the embodiments being here again compatible with usual devices, provided for them to be programmable.

FIG. 1 very schematically shows a mobile telecommunication device (for example, a cell phone) of the type to which embodiments apply as an example. The different elements of interface with the user (keyboard, display, speaker, etc.) have not been shown, since these elements are not modified by the implementation of the embodiments which will be described.

Device 1 comprises a central processing unit 12 (CPU/TH) formed of at least one microcontroller forming the device core. This microcontroller is typically called a terminal host. For the telecommunication operation over a network (GSM, 3G, UMTS, etc.), the microcontroller uses identification and authentication data provided by a subscriber identification module 14 (SIM) which forms a security module of the device. Microcontroller 12 is capable of using one or several internal memories, not shown, of the telephone. Telephone 1 may also comprise a memory card reader 16 or other buses of communication with the outside to load data and/or applications into the telephone.

Mobile devices to which the described embodiments apply combine the telecommunication function with that of a near-field contactless transmission system (NFC). To achieve this, device 1 comprises a circuit 18 (CLF—ContactLess Front-End) forming a near-field communication module like an electromagnetic transponder. Module 18, also called NFC router, is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). A security module is an electronic circuit for securely executing applications and guaranteeing the security (secret/integrity) of data manipulated by such applications.

The different elements of device 1 communicate according to various protocols. For example, circuits 12 and 18 communicate over a link 1218 of I2C or SPI type, SIM card 14 communicates with microcontroller 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

The embodiments will be described in relation with a GSM telephone. Embodiments however, more generally apply to any telecommunication device adapted to a mobile network (for example, Wifi, Bluetooth, WiMax, etc.) and associated with a contactless transmission module (NFC router), for example, a USB key, a bank terminal, a power consumption meter, or other), an access or transport ticket validation terminal, etc.

Similarly, the near-field communication module will be called a router since it generally integrates all the functions useful for the emulation of a contactless card within a same circuit, the described embodiments however applying to any NFC-type module.

Router 18 comprises physical terminals of connection to links 1218, 1418, and 2418 and manages logic gates for assigning these terminals to the different functions associated with near-field communications. Router 18 thus comprises a processor and volatile and non-volatile memories for storing, among other things, a routing table for the different logic gates. Some gates are reserved for router administration functions while others can be freely assigned by the router.

In operation, router 18 makes available and manages different pipes of communication with the other circuits 12, 14, 24, etc. of the mobile device to provide these circuits access to the near-field communication functions, that is, to gates connected to radio frequency transmission circuits, called RF gates.

Figure 2:
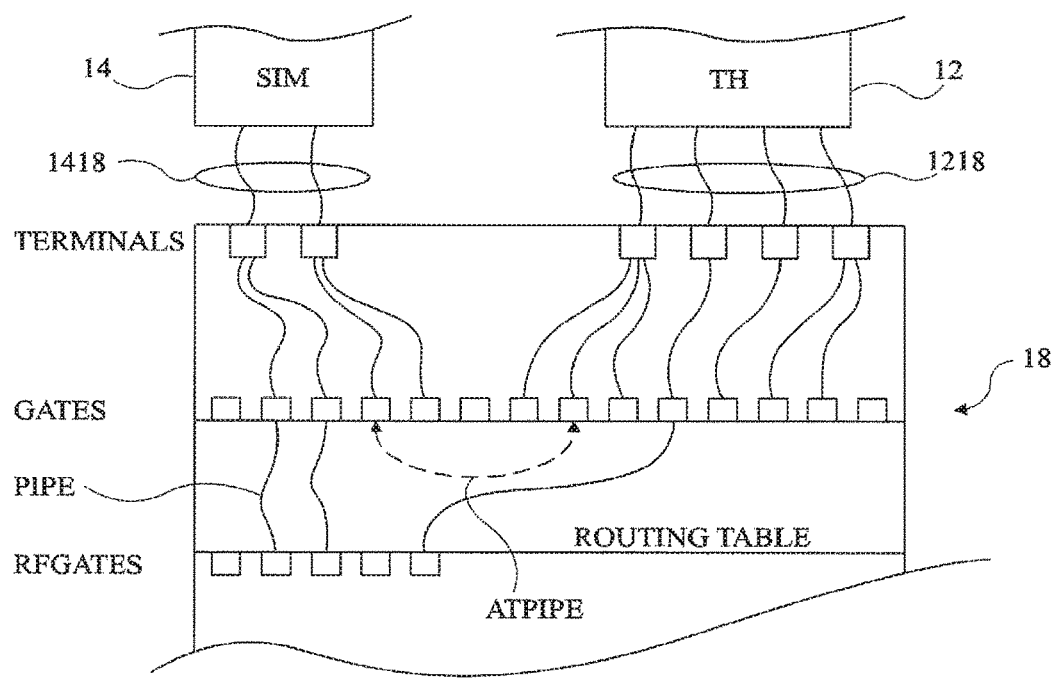
FIG. 2 is a diagram illustrating a function of a near-field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to a same circuit (which is symbolized in FIG. 2 by the connection of a same terminal to several gates). The routing table (ROUTING TABLE) of router 18 assigns some gates to internal functions (for example, configuration and administration functions), but also creates pipes (PIPE) between some gates assigned to the SIM card or to the RF microcontroller, and gates (RF-GATES) comprised in module 18. This corresponds to the creation of pipes (PIPE) between the circuits external to router 18 and its RF transmission circuits for the implementation of the different applications requiring a near-field communication. For example, in bank, transport, electronic purse, access, and other applications which require a secure identification or authentication of the user, one or several pipes are created between the router and the SIM card to use the secure user identification data and validate the transaction.

The integration of NFC routers in mobile telecommunication devices and the sharing of a same security module (SIM card) generate weak points in terms of security.

Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible hacking attempts.

Up to now, the main concern has been to guarantee that a near-field transaction emulated by the mobile device would not enable a pirate device intercepting the near-field communication to exploit data provided by the security module.

However, there remains a risk, since router 18 also manages a pipe (ATPIPE symbolized in dotted lines in FIG. 2) of communication between SIM card 14 or any other security module and microcontroller 12 of the mobile telecommunication device. This pipe is normally used so that SIM card 14 informs microcontroller 12 that a message reaches it over the NFC link. It is however also possible to divert this use to make security module 14 believe that it communicates with the router for a near-field transaction and thus over a pipe with the RF gates of the telephone, while it is actually communicating with microcontroller 12.

FIG. 3 very schematically illustrates in the form of blocks the possible exploitation of a pipe ATPIPE between a SIM card 14 and a microcontroller 12 of a cell phone 1.

It is assumed that, in a preparatory phase of the attack, GSM phone 1 has been hacked and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (MEM) of phone 1 and that this application may provide instructions to microcontroller 12. Several embodiments of the preparatory phase will be discussed subsequently. The user of device 1, once it has been hacked by the loading of application PA and by the creation of pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or another dedicated security module) of this telephone to authenticate the user and validate the payment.

In the mechanism of FIG. 3, at the payment validation, telephone 3 uses the GSM network to ask telephone 1 to validate the payment by means of its subscriber identification module. For example, device 3 sends an SMS over network 5 which, when received by telephone 1, is processed by the pirate application. Said application simulates requests from the RF gates and transmits them over pipe ATPIPE, so that identification module 14 responds and validates the transaction. This validation is diverted by microcontroller 12 and is sent back to device 3 which, in turn, transmits it to its NFC router to validate the payment for terminal 7. As a result, the payment is debited to the subscriber of telephone 1 and not to the attacker owning device 3. Most often, a contactless application requires no interaction with the terminal (7, FIG. 3) except for a presentation of a contactless device. In particular, no PIN keying is required for a near-field communication to avoid lengthening the transactions, so that device 3 may easily hack distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without for pirate device 3 to use its own NFC router, for example, if it uses a contactless communication mode, provided for the requested authentication to originate from a security module and to respect the formats and protocols used by the NFC protocol. Further, such an attack may be used to divert any data from device 1 in favor of a pirate system (for example, data duplicating the content of the magnetic track of a card in a bank payment application).

Further, the attack may involve the SIM card of cell phone 1 or of any other security module (for example, module 24), provided for a pipe to be managed by router 18 between this module and a circuit (generally, microcontroller 12) capable of managing communications over network 5.

This attack on near-field transactions, exploiting the telecommunication network, is due to the presence of a pipe of communication, via the NFC router, between a security module and a microcontroller connected to this router.

Implementing the attack requires a preparatory phase in which an intervention of the telephone 1 which is desired to be pirated is necessary. This preparation requires an intervention depending on the security level provided by the SIM card to the management of the NFC communication pipes.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card.

According to another embodiment, security module 14 is more advanced and checks the association between the numbers of the pipes or of its own gates and the RF gates.

In a first case, it is considered that SIM card 14 does not take into account the circuit with which the gate is created (and thus, the fact that it may be a gate intended for the microcontroller). This embodiment exploits the fact that the assignment of the pipe numbers (identifiers) is often sequential. It is first started by asking the microcontroller to suppress a pipe between the SIM card and the RF gates. Then, a pipe having the same identifier is created between the microcontroller and the SIM card.

FIG. 4 illustrates another embodiment of a preparatory phase of the attack aiming at diverting a pipe between router 18 (CLF) and the SIM card (SIM1) of a user. This embodiment is more specifically intended for systems in which the SIM card makes sure, before transmitting data to the CLF router, that it has effectively controlled the creating of the communication pipe therewith.

The fact that, prior to the initialization of device 1, the SIM card checks whether it has already been in the presence of router 18 is exploited herein. If it has not, it reconfigures the pipes between its gates and the NFC router.

In a normal operation, at the first connection of card SIM1 in telephone 1, the card causes the creating, at the level of the so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID, and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 into a pirate device (PIRATE READER), for example, another cell phone having a microcontroller capable of executing a piracy program complying with the described functions, or a computer provided with a card reader and simulating a router. Since card SIM1 has never met the NFC router of the pirate device or the router emulated by said device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microcontroller instead of associating gate GATEID to an RF gate. Identifier FPIPEID and identifiers SYNCID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFGATEID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, a phase of observation of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYN-CID2, the card considers that it "knows" the router and does not recreate pipes therewith. When card SIM1 requests a communication towards gate RFGATEID, the router uses the assigned pipe FPIPEID.

The GSM terminal has effectively been hacked, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There are various possibilities, depending on device 1. For example, the routing table may be read from. If this is not possible, it is possible, when card SIM1 is in the pirate reader, to emulate an operation of the CLF circuit, in order to obtain the full configuration stored in this card. A pirate card SIM2 or a card emulator may also be used to extract the data from the routing table in valid phone 1.

It can thus be seen that it is possible to parameterize the diverting of a communication pipe between a security module and an NFC router to establish a pipe between this module and the telephone microcontroller, external to the NFC router.

So that the user of telephone 1 does not notice the piracy, even when he uses his contactless mode, the pirate application should comprise the function of redirecting pipe FPIPE towards the RF circuits of the router when a data request towards the SIM is transmitted by router 18.

Figure 5:
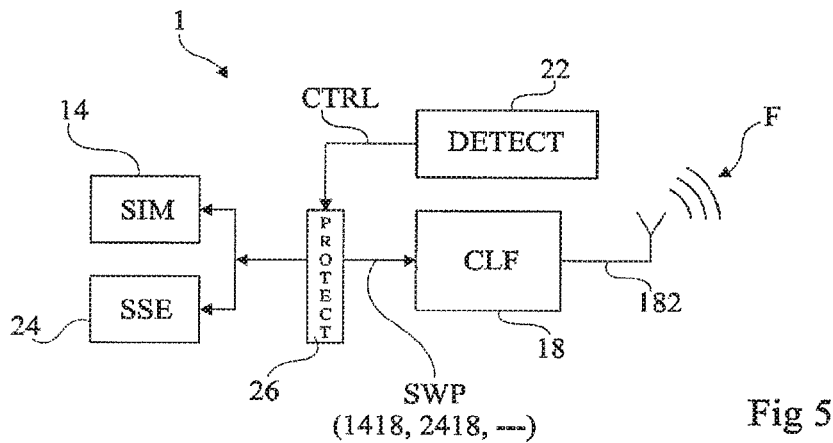
FIG. 5 is a block diagram illustrating an embodiment of a method of protection against such an attack.

FIG. 5 is a block diagram illustrating an embodiment of a method for detecting a near-field communication.

For simplification, part of the components of the mobile device (1, FIG. 1) have not been shown. Only near-field communication router 18 (CLF), its antenna 182, and security modules (in the example of FIG. 5, a SIM card 14 and an additional security module 24 (SSE)) have been illustrated. As will be seen hereafter, the protection provided by the embodiments which will be described may block any communication between the near-field communication router and the other elements of device 1.

A circuit 22 (DETECT) for detecting a radio frequency communication flow received by router 18, most often due to the presence of an electromagnetic field F detected by router 18, is provided. Detection circuit 22 is used to control (signal CTRL) a circuit 26 for protecting the exchanges between router 18 and the other circuits of mobile device 1, more specifically, its security modules 14 and 24. As a variation, signal CTRL signals the possibility of an attack to microprocessor 12, which is programmed to take the appropriate measures.

Circuit 22 may also decode the messages transmitted by router 18 to security modules 14 and 24. In the absence of a field F usable by CLF router 18, circuits 22 and 26 block any transmission to the security modules of messages having a content reserved to a radio frequency communication (for example, events of activation of a security module EVT-_CARD_ACTIVATED or of activation of a magnetic field EVT_FIELD_ON). Accordingly, in case of a fraud attempt such as previously described, the attack which exploits the telecommunication network to make the router believe that it is in the presence of a near-field communication terminal cannot be successful.

It should be noted that the described embodiments do not avoid the attack attempt and, in particular, the implementation of the preparatory phase illustrated in FIG. 4. However, a hacked mobile device will remain unable to bring to an end the attack targeting the security module.

Several modes of detection of the presence of an electromagnetic field F may be provided.

Figure 6:
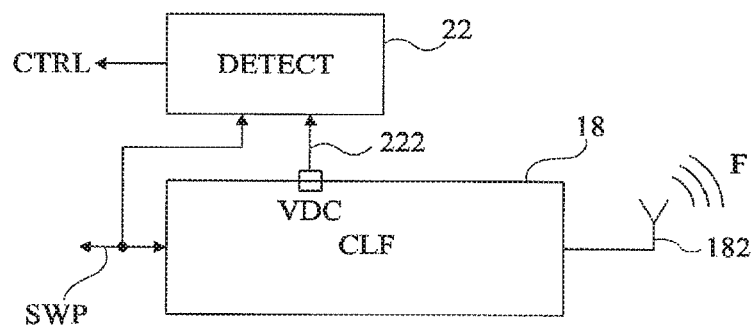
FIG. 6 is a diagram illustrating an embodiment of a near-field communication detection.

FIG. 6 is a block diagram illustrating an embodiment according to which detection circuit 22 comprises a connection 222 with the CLF router. More specifically, detector 22 detects the presence of a power supply voltage across a reservoir capacitor (not shown) temporarily storing the power in the case of a remote supply. More generally, the detector detects the presence of a voltage VDC extracted from the radio frequency flow by router 18. In the presence of a field, the CLF router extracts the power supply voltage VDC from a rectification of the signal detected by an oscillating circuit, to power its circuits. Such an embodiment is particularly simple since it is sufficient to detect the presence of a power supply voltage generated from electromagnetic field F on a power supply bus of NFC router 18 greater than a threshold, to allow communications of messages with a content reserved to radio frequency communications between the router and the other elements of the mobile device. Circuit 22 further receives the signals present over the SWP bus at the output of router 18, which enables it to observe the messages sent by the router to the secure elements and to interpret their content.

Figure 7:
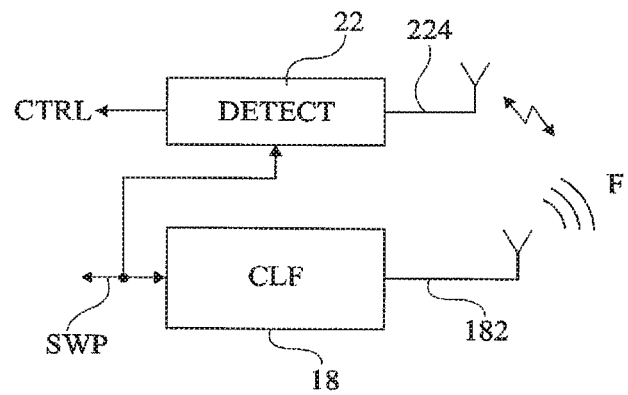
FIG. 7 is a block diagram illustrating another embodiment of a near-field communication detection.

FIG. 7 is a diagram illustrating another embodiment according to which detection circuit 22 is equipped with an antenna 224 capable of detecting electromagnetic field F. Thus, antenna 224 detects the presence of a field to validate or invalidate transfers over the SWP bus based on signal CTRL. Antenna 224 belongs to a resonant circuit, preferably approximately tuned to the same frequency as the NFC router.

The described control can be implemented whatever the type of connection between CLF router 18 and the security module(s) or other circuits of device 1 (for example, connections 1218, 1418, and 2418 in FIG. 1).

According to a preferred embodiment, advantage is taken from the fact that communications between the CLF and the other circuits of the mobile device, and more specifically its security modules, are performed over a single-wire bus (SWP—Single Wire Protocol).

Figure 8:
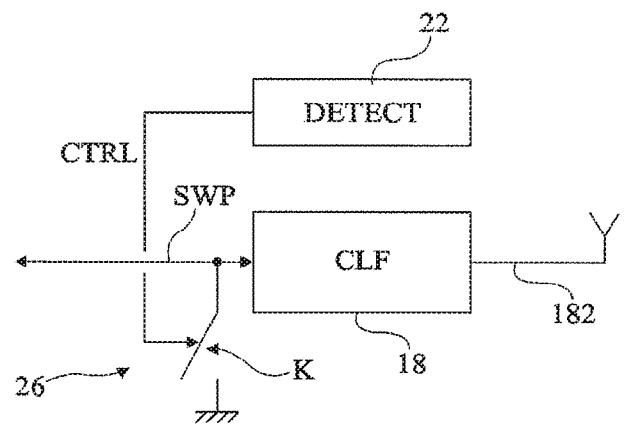
FIG. 8 is a block diagram illustrating an embodiment of a protection circuit.

FIG. 8 very schematically shows in the form of blocks an embodiment of a protection element 26 associated with detection circuit 22. The detection mode has not been detailed in FIG. 8, since it may be of any type. In the embodiment of FIG. 8, a single-wire bus (SWP) of communication between the CLF router and the other circuits of mobile device 1 is considered.

A particularly simple embodiment is to provide a switch K capable of pulling the bus to ground under control of signal CTRL. Thus, the SWP bus is inhibited by detection circuit 22 as soon as a message reserved to radio frequency communications is detected while no radio frequency field is detected. Switch K for example is a switch which is off in the idle state, which avoids the need for a permanent power supply even when the device is not powered. Indeed, the attack cannot succeed if the device is not powered.

Figure 9:
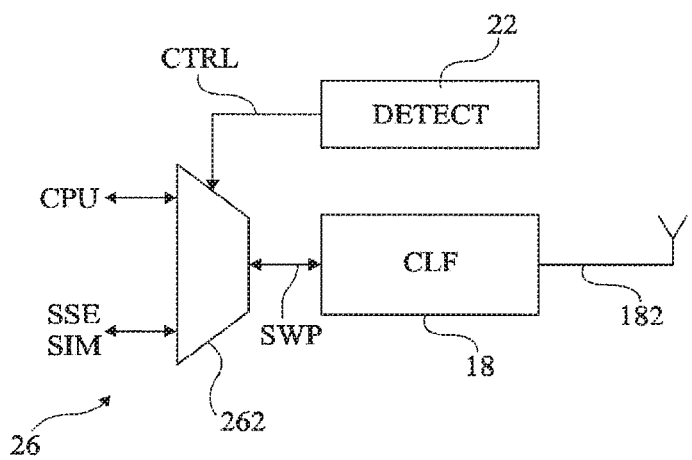
FIG. 9 is a block diagram illustrating another embodiment of a protection circuit.

FIG. 9 is a block diagram of another embodiment of a protection circuit 26. A multiplexer 262 is interposed on the SWP bus between the CLF router and the other circuits of device 1. According to the state of signal CTRL, the multiplexer directs this bus towards one of the security modules (SSE or SIM) or towards the non-critical circuits of device 1 (for example, central processing unit CPU). This embodiment preserves an operation of the CLF router towards non-critical applications hosted by the mobile device and to only protect the applications requiring an access to a security module.

Various embodiments have been described. Various alterations, modifications, and improvements will occur to those skilled in the art. Further, the practical implementation of the described embodiments is within the abilities of those skilled in the art based on the functional indications given hereabove. For example, the electromagnetic field detection by detector 22 may come along with a detection of the type of message received by the CLF outer to make out an electromagnetic field from a real communication. This then improves the protection by preventing the attack from succeeding in the case where the mobile device incidentally is in the presence of a field.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A mobile device, comprising:
   a processing unit;
   a security module communicatively bidirectionally coupled to the processing unit;
   a contactless front end communicatively bidirectionally coupled to the processing unit and to the security module;
   a detection circuit arranged to provide a detection signal, the detection signal indicating whether the mobile device is in detectable proximity to a contactless communications terminal arranged for communication with the contactless front end; and
   a multiplexer circuit having a first signal input coupled to the processing unit, a second signal input coupled to the security module, an output coupled to the contactless front end, and a control input coupled to receive the detection signal, wherein the multiplexer circuit is arranged to:
      disallow communication between the security module and the contactless front end and allow communication between the processing unit and the contactless front end in response to the detection signal indicating that the mobile device is not in detectable proximity to the contactless communications terminal; and
      in response to the detection signal indicating that the mobile device is in detectable proximity to the contactless communications terminal, allow communication between the security module and the contactless front end and disallow communication between the processing unit and the contactless front end.

2. The mobile device according to claim 1, wherein the security module is arranged as a subscriber identification module, and the communicative bidirectional coupling between the security module and the processing unit conforms to an International Standards Organization (ISO) 7816-3 protocol.

3. The mobile device according to claim 1, comprising:
   a first antenna arranged to wirelessly communicate data across a mobile telephony network; and
   a second antenna distinct from the first antenna, the second antenna arranged to wirelessly communicate near field transactions with the contactless communications terminal.

4. The mobile device according to claim 3, comprising:
   a third antenna distinct from the first antenna and the second antenna, the third antenna coupled to the detection circuit, wherein the detection circuit is arranged to provide the detection signal based on a detection of a near field signal passed through the third antenna.

5. The mobile device according to claim 1, wherein the detection circuit is arranged to provide the detection signal based on a detection of a voltage signal extracted by the contactless front end from a wireless near field transaction signal of the contactless communications terminal.

6. The mobile device according to claim 1, comprising:
   a second security module communicatively bidirectionally coupled to the contactless front end, the second security module arranged as an electronic circuit having stored thereon at least one security application and at least one secret datum.

7. The mobile device according to claim 1, wherein the contactless front end is arranged to carry out near field transactions that conform to a near field communications (NFC) protocol.

8. The mobile device according to claim 1, further comprising a routing table associated with the contactless front end, wherein the contactless front end and the security module are configured to arrange at least some bidirectional communications according to the routing table.

9. A device, comprising:
processing means for directing operations of the device;
security means for providing, to the processing means, identification data and authentication data that enable a telecommunication operation over a network;
contactless front end means for performing near field transactions in cooperation with a contactless communications terminal;
detection means for generating a detection signal, the detection signal indicating whether the device is in detectable proximity to the contactless communications terminal; and
switch means having a first signal input coupled to the processing unit, a second signal input coupled to the security module, an output coupled to the contactless front end, and a control input coupled to receive the detection signal, wherein the switch means are for:
disallowing communication between the security means and the contactless front end means and allowing communication between the processing means and the contactless front end means in response to the generated detection signal indicating that the device is not in detectable proximity to the contactless communications terminal; and
allowing communication between the security means and the contactless front end and disallowing communication between the processing unit and the contactless front end in response to the detection signal indicating that the device is in detectable proximity to the contactless communications terminal.

10. The device according to claim 9, comprising:
a first antenna arranged to wirelessly communicate telecommunication data across the network, wherein the network is a mobile telephony network;
a second antenna distinct from the first antenna, the second antenna arranged to wirelessly communicate near field transaction data to and from the contactless communications terminal; and
a third antenna distinct from the first antenna and the second antenna, the third antenna coupled to the detection means, wherein the detection means include a circuit arranged to provide the detection signal based on a detection of a near field signal passed through the third antenna.

11. The device according to claim 9, wherein the detection means include a circuit that provides the detection signal when a voltage signal extracted from a wireless near field transaction signal is detected.

12. The device according to claim 9, wherein the telecommunication operation conforms to a Global System for Mobile Communications (GSM) protocol.

13. The device according to claim 9, wherein the protection means include a multiplexer.

14. A mobile device method, comprising:
directing operations of the device with a processing unit;
providing, from a security module, identification data and authentication data to the processing unit to enable telecommunication operations over a network;
performing, through a contactless front end, near field transactions in cooperation with a contactless communications terminal;
generating a detection signal to indicate whether the mobile device is in detectable proximity to the contactless communications terminal;
using a multiplexer, disallowing communication between the security module and the contactless front end and allowing communication between the processing unit and the contactless front end in response to the detection signal indicating that the mobile device is not in detectable proximity to the contactless communications terminal; and
allowing communication between the security module and the contactless front end and disallowing communication between the processing unit and the contactless front end in response to the detection signal indicating that the mobile device is in detectable proximity to the contactless communications terminal.

15. The mobile device method according to claim 14, comprising:
wirelessly communicating telecommunications data through a first antenna across the network;
wirelessly communicating near field transaction data through a second antenna, the second antenna distinct from the first antenna; and
detecting a presence of an electromagnetic field with a third antenna, the third antenna distinct from the first antenna and the second antenna, wherein generating the detection signal includes generating the detection signal based on detecting the presence of the electromagnetic field.

16. The mobile device method according to claim 14, wherein generating the detection signal includes detecting a voltage signal extracted by the contactless front end from a wireless near field transaction signal.

17. The mobile device method according to claim 14, wherein disallowing communication with the security module includes diverting data communicated from the contactless front end based on a state of the detection signal.

18. The mobile device method according to claim 14, comprising passing the identification data and authentication data provided to the processing unit over a bus that conforms to a Single Wire Protocol (SWP).

* * * * *